A. N. ADAMS.
AUTOMATIC GEAR SHIFTER.
APPLICATION FILED OCT. 27, 1913.
1,138,719.
Patented May 11, 1915.
2 SHEETS—SHEET 2.
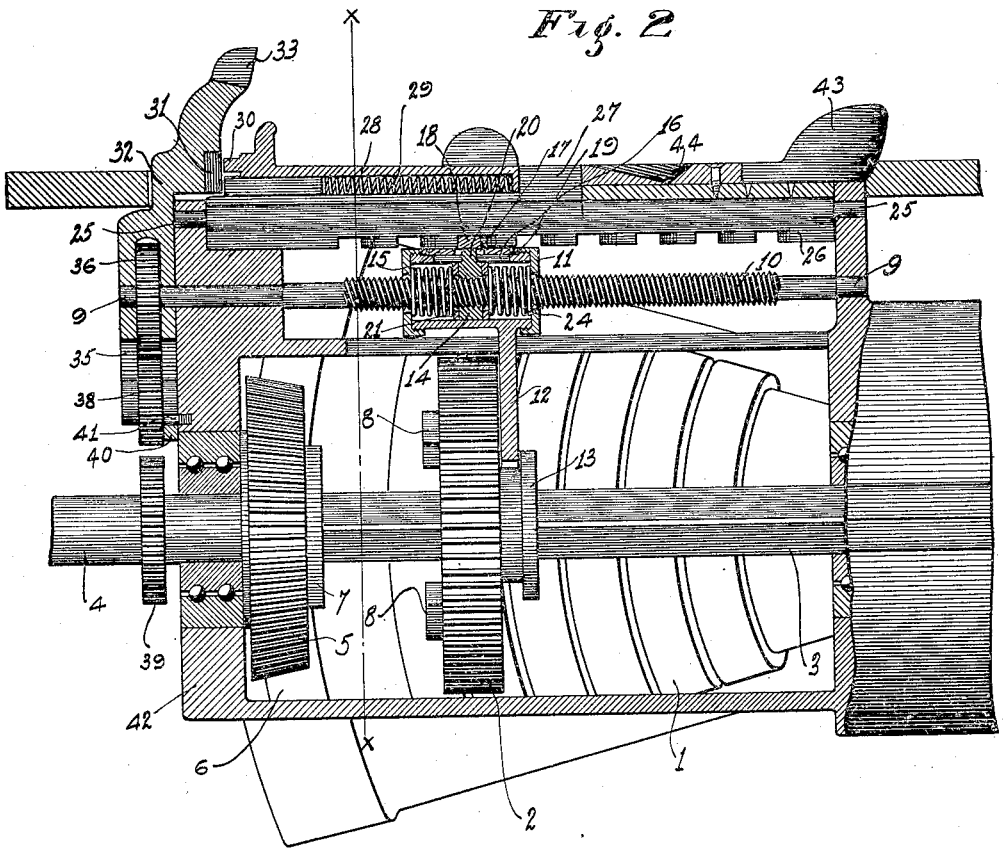
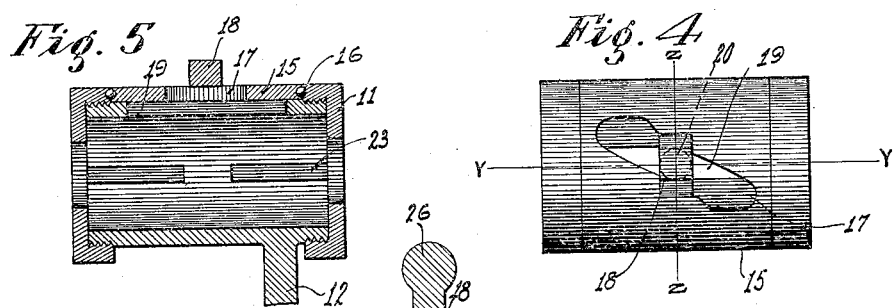
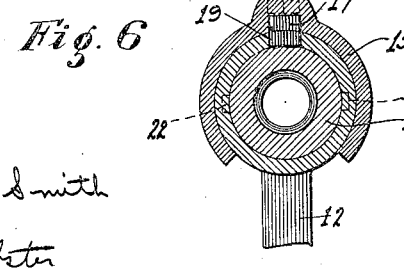
WITNESSES:
Clarence M. Smith
J. B. Webster
INVENTOR.
A. N. Adams
BY
ATTORNEYS.

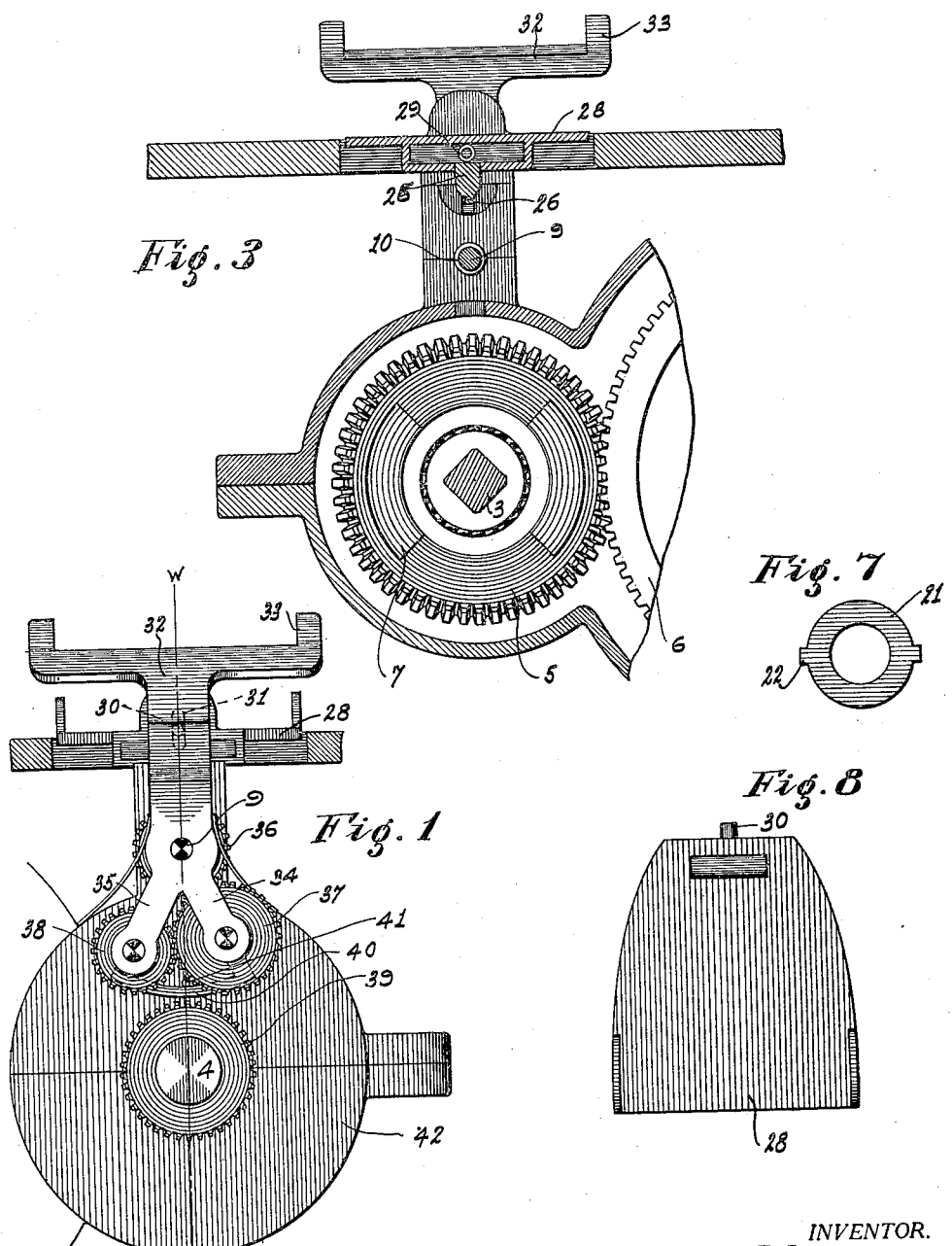

UNITED STATES PATENT OFFICE.

ALFRED N. ADAMS, OF STOCKTON, CALIFORNIA.

AUTOMATIC GEAR-SHIFTER.

1,138,719.  Specification of Letters Patent.  Patented May 11, 1915.

Application filed October 27, 1913. Serial No. 797,417.

*To all whom it may concern:*

Be it known that I, ALFRED N. ADAMS, a citizen of the United States, residing at Stockton, in the county of San Joaquin, State of California, have invented certain new and useful Improvements in Automatic Gear-Shifters; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in transmission mechanisms and is particularly designed as a gear shifting device for transmission gearing especially adapted to the type of transmission gearing shown in my Patent No. 1,065,996, dated July 1st, 1913, and my pending application for patent, Ser. No. 667,572 and filed December 26th, 1911.

The object of the invention is to provide a foot controlled automatic shifter for a cone of gears of the type shown in the above mentioned patent and application for patent, whereby the pilot gear may be shifted from point to point on the cone of gears by the motive power connected with such gearing without the necessity of operating the same manually.

A further object of the invention is to produce a mechanism whereby the shifting mechanism may be controlled and stopped automatically at any point desired along the cone of gears.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is an end view of the complete mechanism. Fig. 2 is a sectional view taken on a line W—W of Fig. 1. Fig. 3 is a sectional view taken on a line X—X of Fig. 2. Fig. 4 is a top plan view of a screw propelled carrier. Fig. 5 is a sectional view taken on a line Y—Y of Fig. 4. Fig. 6 is a sectional view taken on a line Z—Z of Fig. 4. Fig. 7 is a plan view of a washer having guide lugs thereon. Fig. 8 is a plan view of a foot plate.

Referring now more particularly to the characters of reference on the drawings, the numeral 1 designates an outline view of the transmission cone of gears over which is movable the pilot or driven gear 2. This gear 2 is mounted on a shaft 3 and is designed to be moved along said shaft to engage the cone of gears 1 at different points to determine the speed at which the shaft 3 shall be driven.

The numeral 4 designates the driving shaft from the motive means on which is connected the main driving gear 5 which intermeshes with the main driven gear 6 connected with the cone of gears 1.

The numeral 7 designates a clutch disk secured to the gear 5 and adapted to be engaged by clutch dogs 8 on the gear 2 to make a direct drive between the shaft 4 and the shaft 3 which will be the highest speed at which the shaft 3 can be driven, the varying speed being determined by engagement with the gear 2 by the cone of gears 1. In order therefore to get the varying speeds for the shaft 3, it is necessary that the gear 2 be moved along the shaft 3 to either engage the member 7 or engage the various gears of the cone of gears 1 and to this end I have designed the invention herein shown and claimed which comprises the following structure, namely: Journaled above the gearing just described is a shaft 9 threaded as at 10 for the greater portion of its length and movable over this shaft 9 is a carrier comprising a cylinder 11 which is provided with a downwardly projecting yoke 12 engaging a collar 13 on the gear 2. This carrier is adapted to be moved along the threaded portion 10 by means of a threaded nut 14, screw mounted on the threads 10 within the carrier 11, which nut 14 is connected with the carrier 11 by means of the following structure, namely: A segmental portion of the carrier 11, as at 15, is turnable with respect to the carrier 11 and engages the remaining portion of the carrier 11 by means of ball bearings 16 interposed between the edges of said segmental portion 15 and the main portion 11. This segmental portion 15 is provided with a slot 17 above which is a lug 18. This slot 17 projects diagonally across the portion 15 underneath the portion 18 and the main portion of the carrier 11 is provided with an elongated slot 19 disposed longitudinally thereof and across which the slot 17 projects. The nut 14 has a lug or tit 20 which projects through the slot 19 and into the slot 17. On each side of the nut 14 is interposed a washer 21, each washer having lugs or tits 22 movable in slots 23 in the sides of the carrier body 11, which slots terminate at their inner ends directly on each side of the central position of the nut 14. A spring 24 is interposed between each end of the carrier 11 and one of the washers 21.

Journaled above the shaft 9 is a rocking shaft 25 provided with a depending toothed bar 26, such teeth being adapted to engage the lug 18 to hold the carrier 11 against any action along the shaft 9—10, except when desired. Formed as a component part of the shaft 25 is an upwardly projecting guide 27 slidable in which is a foot plate 28 having a spring 29 to hold it in normal position. On the forward end of the member 28 is a projecting pin 30 adapted to engage a recess 31 in a lever 32 fulcrumed on the shaft 9 and provided at its upper end with a foot receiving member 33. On the lower end of the lever 32 is a pair of branches 34 and 35. Keyed to the shaft 9 is a gear 36 and journaled in the branch 34 is a gear 37 engaging the gear 36 and journaled in the branch 35 is a gear 38 engaging the gear 37. Keyed to the shaft 4 is a gear 39 adapted to be engaged by either the gear 37 or 38 when the lever 32 is swung one way or the other on its pivotal point 9. On the lower end of the lever 32 is a quadrant shaped guide 40 movable against a pin 41 secured in the gear casing 42, which structure overcomes a portion of the end strain on the lever 32 when the mechanism is operated.

The numeral 43 designates a heel rest disposed in the floor of the motor vehicle to which the gearing might be attached and in advance of this is a heel notch 44 to which the heel of the operator may be advanced during the operation of the shifter for a purpose as will presently appear.

The device is susceptible of operation in two ways, namely, one for the shifting of the gear 2 from one of the gears 1 to another at single intervals, or for advancing such gear 2 continuously from one point along the gears 1 to another.

Describing first the operation for moving the gear 2, merely from one of the gears 1 to another, the operator places his heel in the recess 44 and the ball of his foot on the foot member 33 and moves the lever 32 on its fulcrum point 9. This throws either one of the gears 37 or 38 into mesh with the gear 39. If the gear 2 is to be advanced from one of the larger gears 1 to a smaller one, then the gear 37 is thrown into mesh with the gear 39 and the motion of the shaft 4 is then transmitted through the gear 39 to the gear 37, thence to the gear 36 which turns the shaft 9 to advance the carrier 11 in that direction which will move the gear 2 from one of the larger gears 1 to one of the smaller ones thereof. The toothed bar 26 engaging the lug 18 tends to lock the carrier 11 against operation except when desired, and hence when the above described movement is to take place it becomes necessary that such lug be moved out of engagement with such toothed bar 26 and this is accomplished by means of the slot 17, since when the nut 14 commences to move upon the threaded portion 10 of the shaft 9, the lug 20 projecting into such slot 17 will slide along said slot and thus gradually turning the member 15 and drawing the lug 18 out of engagement with the toothed bar 26, the necessary longitudinal movement of such lug 20 being maintained by reason of its projecting through the straight longitudinal slot 19. Then when this movement of the nut 17 has completely moved the lug 18 out of engagement with the toothed bar 26, the spring 24 against which it has moved has become compressed between the nut 14 and the end of the carrier 11. The instant that the lug 18 is free from the toothed bar 26, the tendency of the spring 24 to expand then throws the carrier 11 to such position as will bring the lug 20 back to normal central position within said carrier, this normal central position being determined by the movement of the lugs 22 in the slots 23, such lugs striking the inner ends of said slot with the expansion of the said spring 24 when the said carrier 11 has moved to such position as brings the nut 14 and lug 20 into normal central position therein. This movement of the spring 24 driving the carrier 11 is so proportioned that such movement of the carrier 11 will move the gear 2 from engagement with one of the gears 1 to the next succeeding one thereof and at the same time the teeth of the toothed bar 26 are so spaced that this movement will cause the lug 18 to also move into the next succeeding space between the teeth whereby the carrier will be again locked into position. If the reverse movement to that above described is desired, the lever 32 will be moved to bring the gear 38 into engagement with the gear 39 which will cause a reverse action from that above described.

Describing now the operation of moving the gear 2 along a series of gears 1 in one movement, it is pointed out that in order to do this successfully the toothed rack 26 must be held continually out of engagement with the lug 18 during this operation. Therefore, the operator places his foot with his heel on the member 43 and the ball of his foot on the plate 28 and then moves such plate 28 forward against the spring 29 until the lug 30 engages the recess 31. He then rocks said plate 28 on the pivotal point 25 which throws the toothed bar 26 out of engagement with the lug 18 and at the same time moves the lever 32 to bring one or the other of the gears 37 or 38 into engagement with the gear 39 and the movement of the shaft 4, as has been described, then moves the threaded shaft 9 to advance the nut 14 and incidently the carrier 11 along the threaded portion 10 to such point as is desired, when the operator removes his foot from the plate 28 and the spring 29 throws the lug 30 out of engagement with the recess 31 and brings the plate 28 to normal position, which operation stops the movement of the shaft 9 and at the same time causes the toothed bar 26 to engage the lug 18 and lock the carrier 11 in the position in which it is left.

From the foregoing description it will readily be seen that my improved shifter can be operated with the power of the motive means of a motor vehicle without the necessity of using hand levers to any degree and also one which can be controlled with great efficiency either for making a single movement or a continuous movement of the gear 2 either along the cone of gears 1 or to cause the members 8 to engage the member 7 for direct driving connection.

From the foregoing description it will readily be seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A device of the character described comprising the combination with a driving shaft and a plurality of gears driven thereby, of a gear adapted to engage said plurality of gears, a threaded shaft, a nut mounted on said threaded shaft and engaging said single gear, a gear secured to said threaded shaft, another gear secured to said driving shaft, a swinging lever, a pair of gears carried thereby, one of said gears engaging the gear on said threaded shaft and both of said gears being capable of being brought into independent engagement with said driving shaft gear, said pair of gears engaging each other, as described.

2. A device of the character described comprising the combination with a driving shaft and a plurality of gears driven thereby, a driven shaft, a gear on said driving shaft and a gear on said driven shaft, a lever, a pair of gears carried by said lever, one of said gears engaging the gear on said driven shaft and each of said gears being capable of being brought into independent connection with the gear on said driving shaft, said pair of gears engaging each other, a carrier movable on said driven shaft, a gear carried by said carrier and engaging said plurality of gears, a swinging bar having a normal engagement with said carrier to lock the same against action when said pair of gears are out of engagement with the gear on said driving shaft and a member slidable on said swinging bar and adapted to engage said lever whereby said lever may be moved with the movement of said swinging bar, as described.

3. A device of the character described comprising the combination with a driving shaft and a plurality of gears driven thereby, of a gear adapted to engage said plurality of gears, means for moving said single gear from a point of engagement with one of said gears to the next succeeding gear and locking the same in that position, means cooperating with said first named means for moving said single gear from a point of engagement with one of said gears over a series of succeeding gears, as described.

4. A device of the character described comprising the combination with a driving shaft and a plurality of gears driven thereby, of a carrier provided with a lug, a single gear connected with said carrier and adapted to engage said plurality of gears, a rocking shaft provided with a toothed bar adapted to engage said lug, means for moving said carrier and means for disengaging said toothed bar from said lug when said carrier is to be moved, as described.

5. A device of the character described comprising the combination with a driving shaft and a plurality of gears driven thereby, of a single gear adapted to engage said plurality of gears, a carrier connected with said single gear and provided with a lug, a shaft, said carrier being screw mounted on said shaft, a lever fulcrumed on said shaft and provided with a gear mechanism, a gear on said driving shaft adapted to engage said gear mechanism on said lever, such gear mechanism being connected with said second named shaft whereby when said gear mechanism is engaged with the gear on said driving shaft, said second named shaft will be operated, a rocking shaft provided with a toothed bar, adapted to engage said lug, and means for disengaging said toothed bar from said lug simultaneously with the operation of said lever to throw said gear mechanism into connection with the gear on said driving shaft, as described.

6. A device of the character described comprising the combination with a driving shaft and a plurality of gears driven thereby, of a single gear adapted to engage said plurality of gears, a carrier connected with said single gear and comprising a tubular member provided with a longitudinal slot, a sleeve turnable on said tubular member and provided with a lug and having a slot disposed diagonally across said longitudinal slot, a nut within said tubular member having a lug projecting through said sleeves, a threaded shaft projecting through said carrier and threaded through said nut, a toothed bar engaging said lug on said turnable sleeve, springs interposed between the ends of said carrier and said nut, and means for turning said threaded shaft, as described.

In testimony whereof I affix my signature in presence of two witnesses.

ALFRED N. ADAMS.

Witnesses:
JOSHUA B. WEBSTER,
CLARENCE M. SMITH.

Copies of this patent may be obtained for five cents each, by addressing the "Commissioner of Patents, Washington, D. C."